United States Patent
Lin

(10) Patent No.: US 9,204,753 B2
(45) Date of Patent: Dec. 8, 2015

(54) POWER SHUTDOWN APPARATUS FOR PREVENTING OVERHEATING OF HOT BEVERAGE MACHINE

(71) Applicant: Uni-Splendor Corp., Tainan (TW)

(72) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 677 days.

(21) Appl. No.: 13/653,471

(22) Filed: Oct. 17, 2012

(65) Prior Publication Data

US 2014/0103740 A1 Apr. 17, 2014

(51) Int. Cl.
*A47J 27/62* (2006.01)
*A47J 37/06* (2006.01)
*A47J 31/00* (2006.01)
*A47J 31/40* (2006.01)
*A47J 31/58* (2006.01)

(52) U.S. Cl.
CPC .............. *A47J 31/58* (2013.01); *Y10T 307/779* (2015.04)

(58) Field of Classification Search
CPC .............................. A47J 31/58; Y10T 307/779
USPC ............................ 99/279–283, 285, 320, 331
See application file for complete search history.

(56) References Cited

U.S. PATENT DOCUMENTS

| | | | |
|---|---|---|---|
| 4,492,834 A | 1/1985 | Smit | |
| 7,377,162 B2* | 5/2008 | Lazaris | A47J 31/4457 222/51 |
| 2004/0118298 A1* | 6/2004 | Lee | A47J 31/56 99/280 |
| 2012/0112371 A1* | 5/2012 | Kanel | F24F 6/02 261/28 |
| 2014/0060335 A1* | 3/2014 | Sachtleben | A47J 31/54 99/281 |

* cited by examiner

*Primary Examiner* — Dana Ross
*Assistant Examiner* — Lindsey C Teaters
(74) *Attorney, Agent, or Firm* — Alan D. Kamrath; Kamrath IP Lawfirm, P.A.

(57) ABSTRACT

The present invention provides a power shutdown apparatus for preventing overheating of a hot beverage machine, comprising a tubular section protruding upward from a bottom of a water tank of the beverage machine and penetrating in top-down manner, a floating pipe inside the tubular section, a magnet within the floating pipe, a limiter attached to an upper opening of the tubular section without covering the tubular section to allow water to be poured in; a sensor at the bottom portion of the tank and adjacent to a sinking portion of the floating pipe; and wherein the floating pipe inside the tubular section sinks correspondingly with a lower water level of the water in the tank to drive the magnet inside the floating pipe to activate the sensor on one side thereof such that power of the heating device of the tank is shut down to prevent overheating of the machine.

4 Claims, 7 Drawing Sheets

POWER SHUTDOWN APPARATUS FOR PREVENTING OVERHEATING OF HOT BEVERAGE MACHINE

BACKGROUND OF THE INVENTION

1. Technical Field

The present invention is related to a power shutdown apparatus for preventing overheating of a hot beverage machine, which mainly provides a floating pipe mounted inside a tubular section predefined in a bottom portion of the water tank of the hot beverage machine and a sensor attached to the bottom of the water tank adjacent to one side of the sinking portion of the floating pipe, and wherein the floating pipe inside the tubular section sinks correspondingly with a low water level dropped by the water in the water tank to drive a magnet inside the floating pipe to activate the sensor provided on one side of said water tank such that power of said heating device of the water tank is shut down to prevent overheating of the hot beverage machine.

2. Description of Related Art

Currently, there are various types of devices designed to prevent overheating of hot beverage machines, among which, a conventional type is to attach a overheating power shutdown apparatus at the heating area of the hot beverage machine. However, since the heating device of the hot beverage machine generates a tremendous amount of steam when it overheats, the coffee particles (powder) stored inside the automatic coffee machine would be soaked wet due to the steam generated, causing unfavorable odor at the following process of brewing of the coffee.

In addition, U.S. Pat. No. 4,492,834 discloses a overheating power shutdown device for a hot beverage machine in the same field. The overheating power shutdown device comprises a floating member 1 provided on one side of the water tank 4, and one end of the floating member 1 is attached to tubular section 8 at the bottom thereof. The other end of the tubular section 8 is attached to the bottom of the water tank 4 correspondingly. Also, a controlling arm 13 penetrates the tubular section 8, and wherein a lower end 14 of the controlling arm abuts a switch 17 at the lower end of the water tank 4 and corresponds to an external button 18; therefore, as the water tank 4 is at a low water level, the floating member 1 is biased to cause the controlling arm 14 penetrating therethrough to disengage from the switch 17 and the external button 18 such that it is at a power shutdown state without further heating.

Nevertheless, the overall structural components involved in such known power shutdown device for controlling the heating of the water tank are complex while occupying a great amount of space for such assembly, which is also inconvenient to the maintenance and repair of the machine.

SUMMARY OF THE INVENTION

The present invention seeks to improve and overcome the current problems associated with the known overheating power shutdown devices for hot beverage machines during their practical uses or operations by providing a floating pipe mounted inside a tubular section predefined at a bottom portion of a water tank of the hot beverage machine and attaching a sensor provided at the bottom portion of the water tank and adjacent to the sinking portion of the floating pipe; wherein the floating pipe inside the tubular section sinks correspondingly with a low water level dropped by the water in the water tank to drive a magnet inside the floating pipe to activate the sensor provided on one side of said water tank such that power of said heating device of the water tank is shut down to prevent overheating of the hot beverage machine. Concurrently, the assembly efficiency of the simplified components is increased, the maintenance and repair are facilities and the overall occupied space thereof is relatively reduced in addition to that the soaking of the steam by the coffee particle (powder) stored inside the hot beverage machine due to the overheating steam is prevented.

A primary objective of the present invention is to provide a power shutdown apparatus for preventing overheating of a hot beverage machine, comprising a tubular section protruding upward from a bottom portion of a water tank of said hot beverage machine and penetrating in a top-down manner, a lower end of said tubular section connected to a internal heating assembly via a water pipe, a floating pipe mounted adjacent to an upper space inside said tubular section, a magnet received within said floating pipe, a limiter attached to an upper opening of said tubular section without covering said tubular section to allow water to be poured into said water tank, a sensor attached to one side of said bottom portion of said water tank and adjacent to a sinking portion of said floating pipe; and wherein said floating pipe inside said tubular section sinks correspondingly with a low water level dropped by said water in said water tank to drive said magnet inside said floating pipe to activate said sensor provided on one side of said water tank such that power of said heating device of said water tank is shutdown to prevent overheating of said hot beverage machine.

A second objective of the present invention is to further provide an additional tubular section further protruding outward from a lower end of said tubular section protruding upward from said bottom portion of said water tank of said hot beverage machine and penetrating in said top-down manner and being connected to a lower inlet of said internal heating assembly for heating a raw water of said hot beverage machine via a water pipe.

A third objective of the present invention is that said limiter attached to said upper opening of said tubular section at said bottom portion of said water tank is secured by a way of locking.

A fourth objective of the present invention is that said tubular section protruding upward from said bottom portion of said water tank of said hot beverage machine and penetrating in said top-down manner comprises an internal space having a shape of a wider upper opening and slanted to a narrower lower end such that a upward and downward movement of said floating pipe is facilitated.

DESCRIPTION OF EMBODIMENTS OF THE INVENTION

Figure 1:
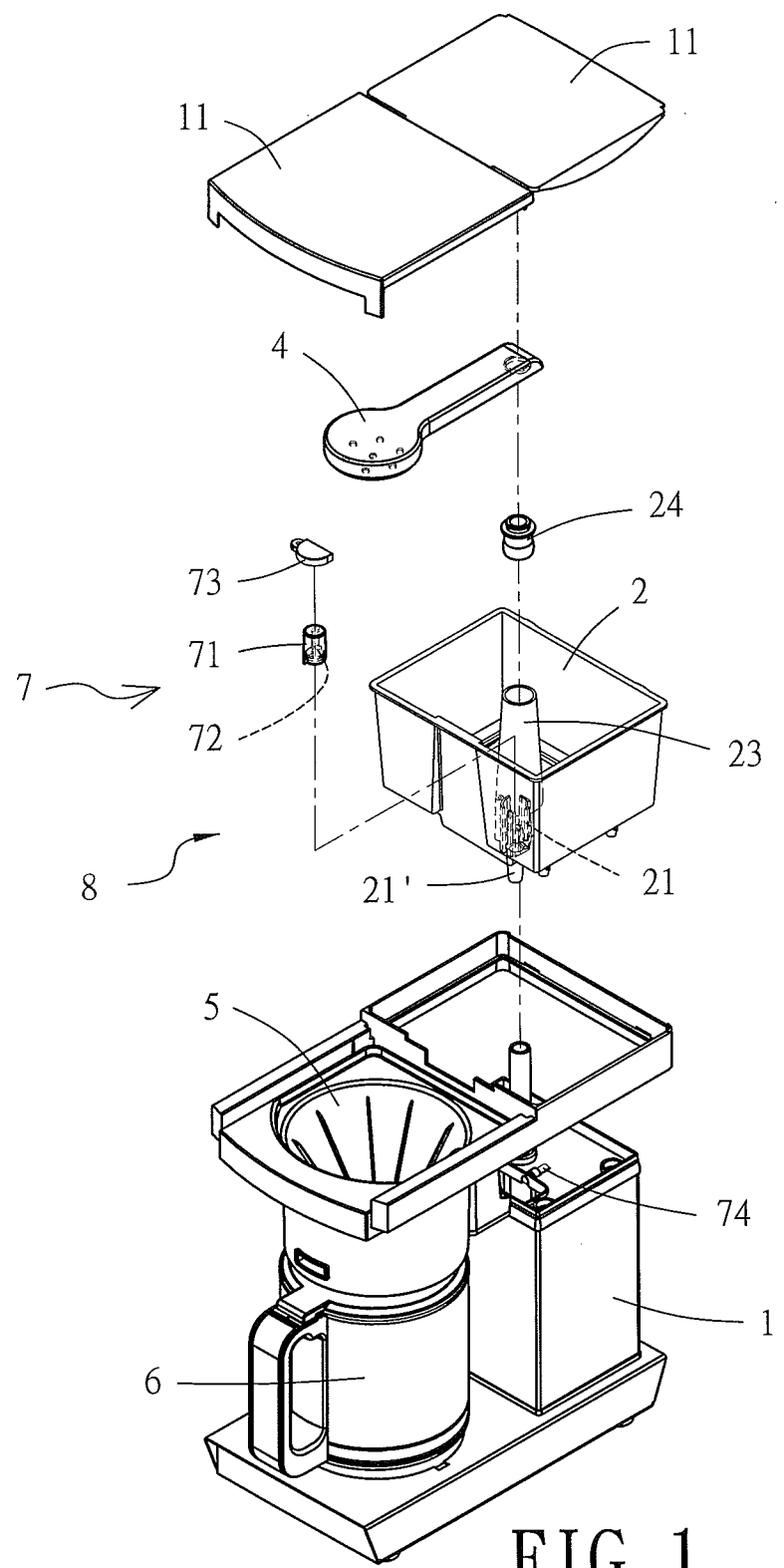
FIG. 1 is an exploded view of the components of the hot beverage machine of the present invention.
Figure 3:
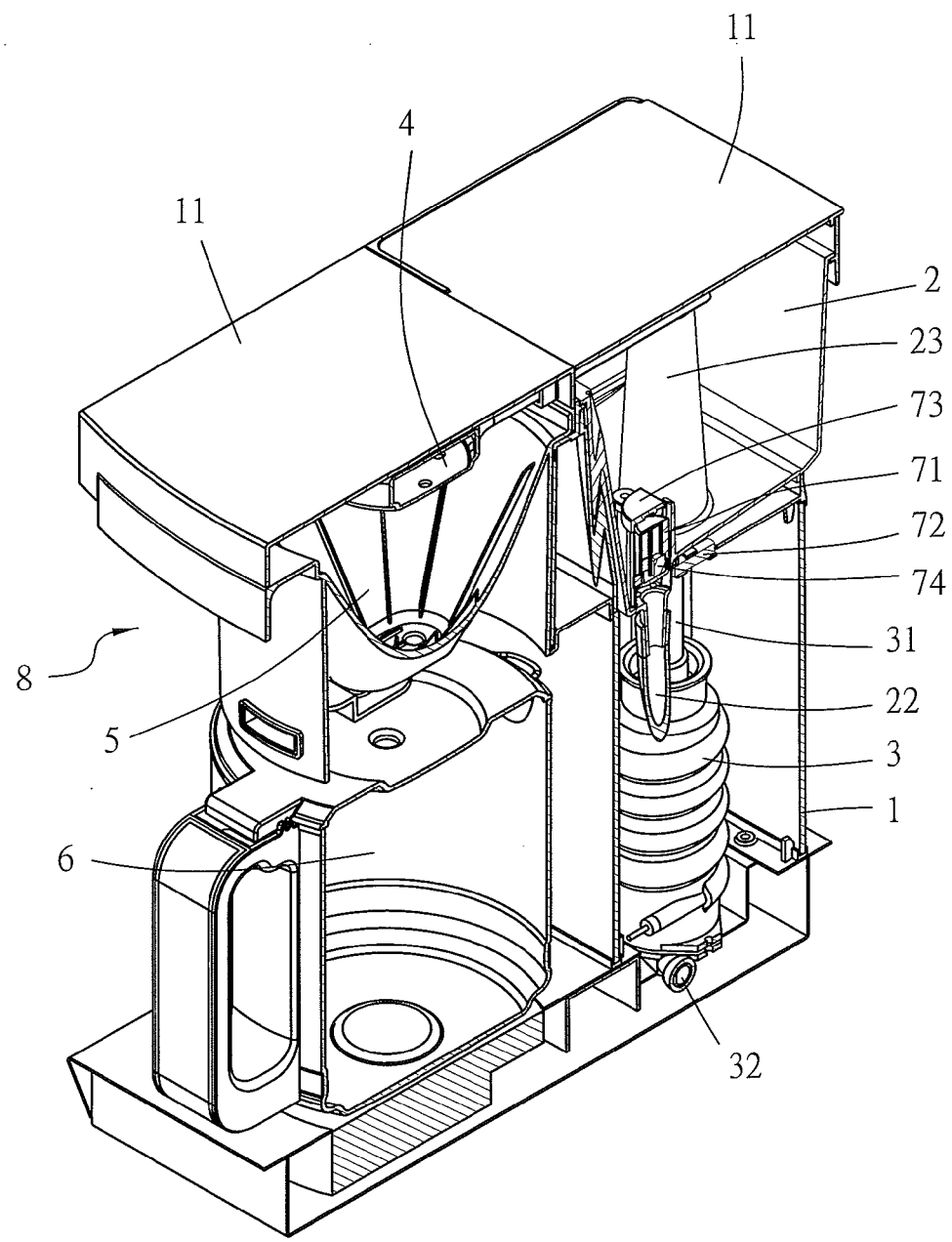
FIG. 3 is a lateral sectional perspective view of the hot beverage machine of the present invention.

As shown in FIGS. 1 and 3, the present invention provides a power shutdown apparatus for preventing overheating of a hot beverage machine 8, mainly for brewing hot beverages including such as coffee and tea, comprising: a main body 1 having a water tank 2 attached to an upper portion on one side thereof and provided for storing a raw water therein, a tubular section 21 is provided on a bottom portion of the water tank 2 and penetrating in a top-down manner to facilitate the raw water to be guided into a water pipe 22 connected to a lower end of the tubular section 21, another end of the water pipe 22 connected to an inlet of an internal heating assembly 3 attached at a lower portion of the main body 1, a high-temperature-resistant tubular section 31 connected to an upper outlet of the internal heating assembly 3 to facilitate a water steam heated and boiled by the internal heating assembly 3 to pass through the tubular section 31, a tunnel 23 between the water tank 2, a connector 24 attached to an upper end of the tunnel 23 and into a sprinkler head 4 attached to an upper end of the main body 1 such that the water steam is able to enter another end of the main body 1 and to a top portion of a container 5 receiving a beverage material therein in order to perform brewing of the beverage material. The completely brewed hot beverage is poured into a cup 6 positioned underneath the container 5. In addition, the water tank 2 of the main body 1 and the top portion of the container 5 can be covered with a flipping lid 11 respectively. The abovementioned description is directed to a known structural configuration of the hot beverage machine 8, and the improvement of the present invention mainly relies on the following.

Figure 5:
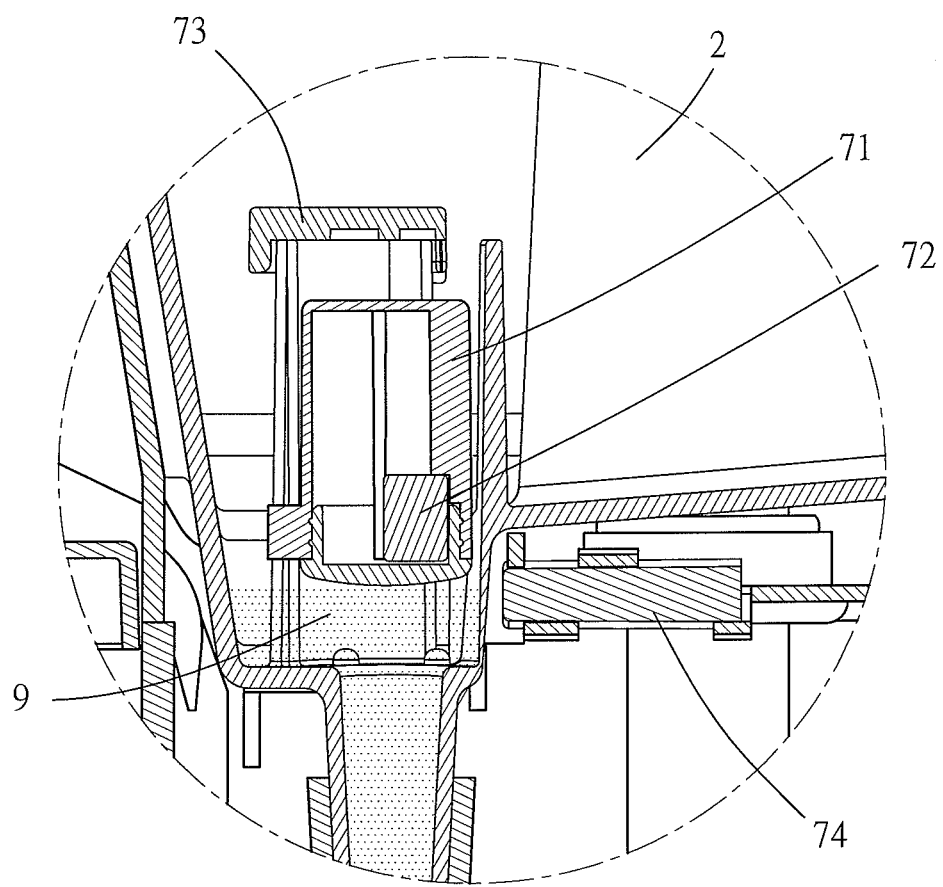
FIG. 5 is an enlarged view of the area 50 in FIG. 4.

The hot beverage machine 8 is provided with a power shutdown apparatus for preventing overheating thereof, and the overheating power shutdown apparatus 7 comprises: a tubular section 21 protruding upward from a bottom portion of a water tank 2 of said hot beverage machine 8 and penetrating in a top-down manner, an additional tubular section 21' further protruding outward from a lower end of said tubular section 21 connected to a lower inlet 32 of said internal heating assembly 3 for heating the raw water of said hot beverage machine 8 via a water pipe 22. A floating pipe 71 is mounted adjacent to an upper space inside said tubular section 21, and in addition, the tubular section 21 includes an internal space having a shape of a wider upper opening and slanted to a narrower lower end, as shown in FIG. 5, such that a upward and downward movement of said floating pipe 71 is facilitated. Also, a magnet 72 is received within said floating pipe 71, and a limiter 73 is attached to an upper opening of said tubular section 21 without covering said tubular section 21 to allow water to be poured into said water tank 2. In this embodiment, the limiter 73 is secured thereon by a way of locking. Furthermore, a sensor 74 is attached to one side of said bottom portion of said water tank 2 and adjacent to a sinking portion of said floating pipe 71.

Figure 2:
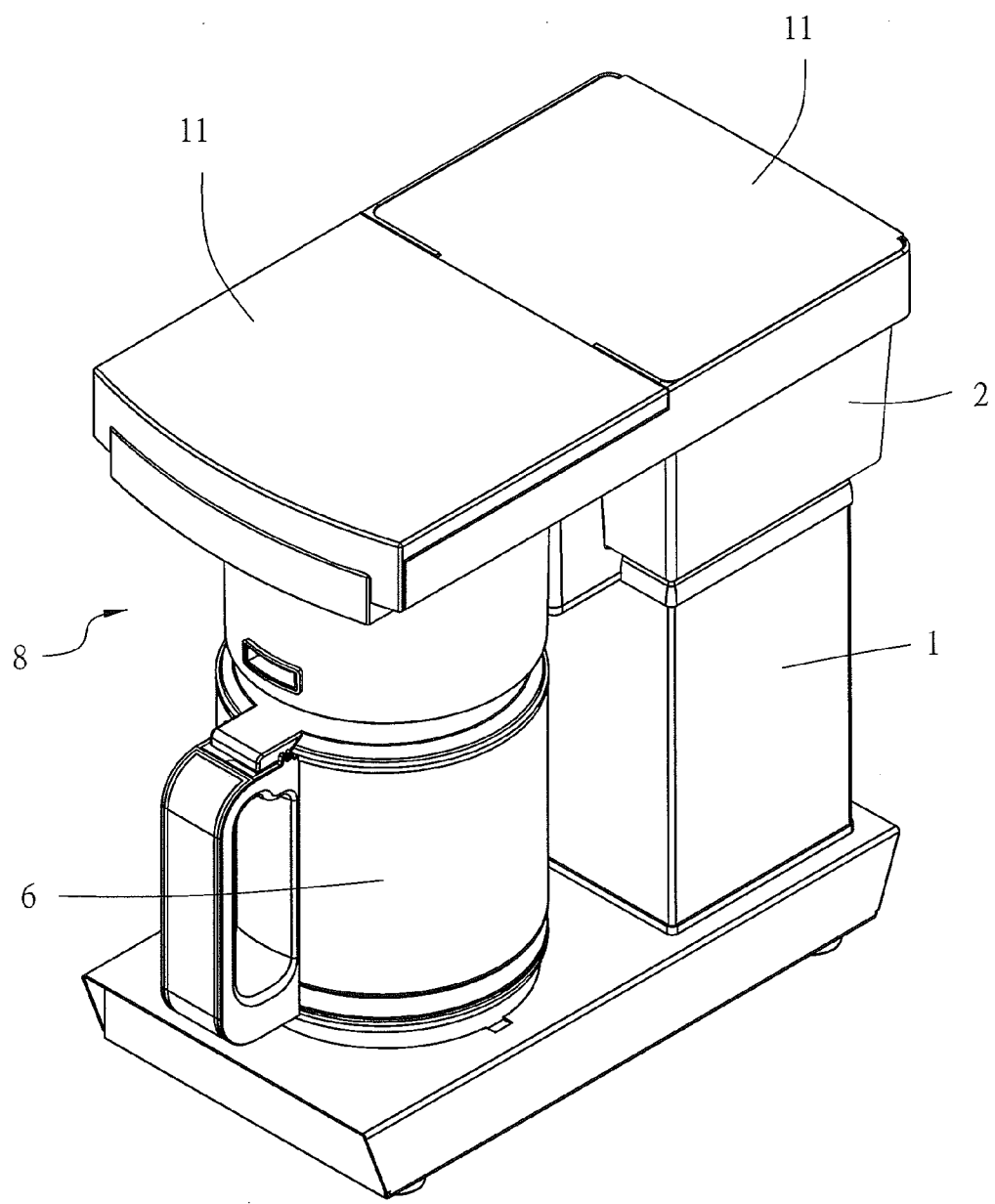
FIG. 2 is a perspective view of the hot beverage machine of the present invention.
Figure 4:
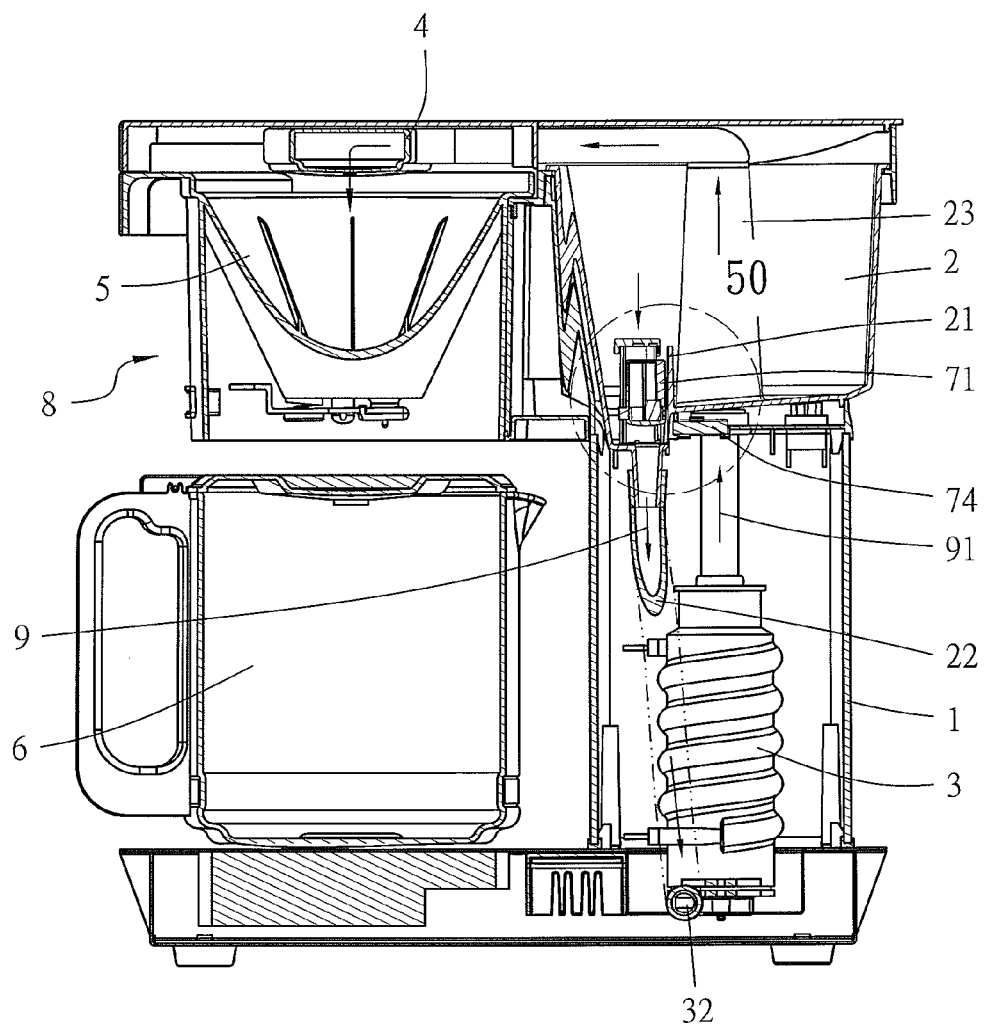
FIG. 4 is a lateral sectional side view of the hot beverage machine of the present invention.

The heating process of the raw water in the water tank 2 attached to the hot beverage machine 8, as shown in FIGS. 2 and 4, includes that the raw water 9 is guided into the water pipe 22 via the tubular section 21 provided between the water tank 2 and further into the internal heating assembly 3 to be heated and boiled to be in the form a water vapor 91. The water vapor 91 then passes through the tubular section 31, the tunnel 23 between the water tank 2, the connector 24 attached to the upper end of the tunnel 23 and to the sprinkler head 4 attached to the top end of the main body 1 such that the water vapor 91 reaches the top of the container 5 provided on another end of the main body 1 in order to perform brewing of the hot beverage material received therein with steam. The completely brewed hot beverage is then poured into the cup 6 positioned underneath the container 5.

Figure 6:
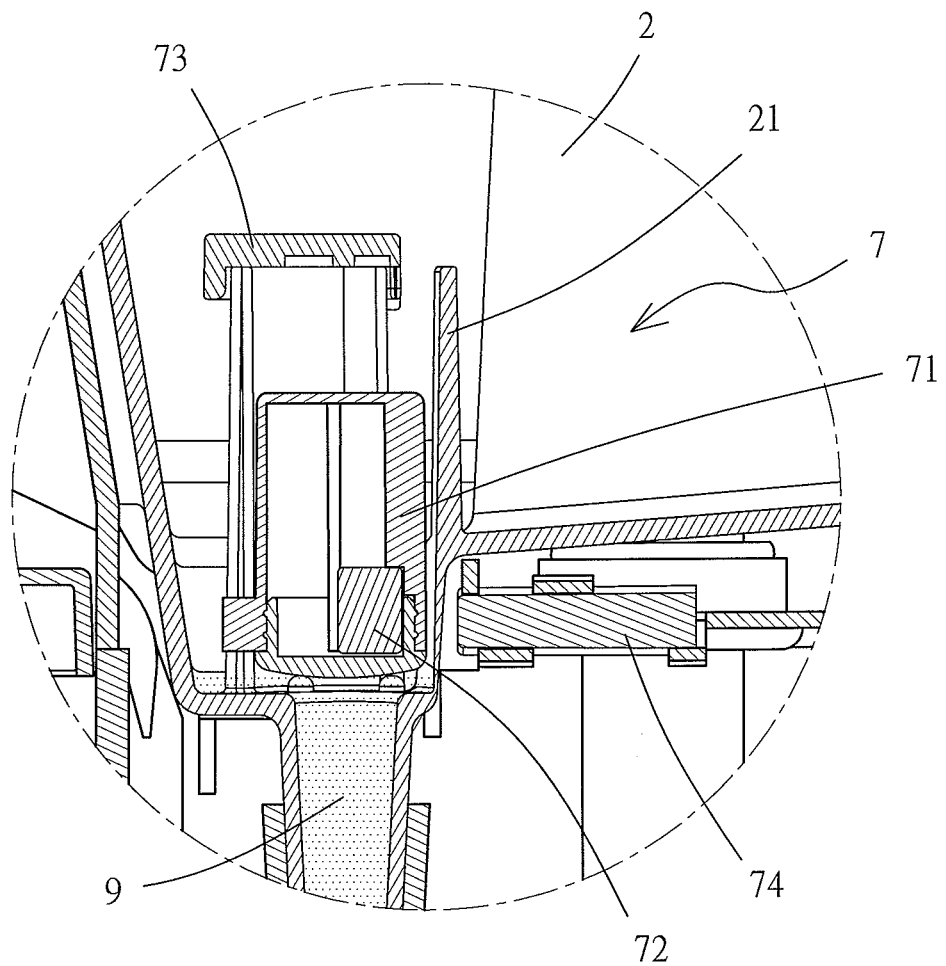
FIG. 6 is an illustration showing the floating pipe at a overly low water level in FIG. 5.

Furthermore, the overheating prevention process during the heating of the raw water of the hot beverage machine 8 attached with the overheating power shutdown apparatus 7, as shown in FIG. 4, includes that said floating pipe 71 inside said tubular section 21 is able to sink correspondingly with a low water level dropped by said raw water 9 in said water tank 2, as shown by the overly low water level in FIG. 5 or 6, and to further drive said magnet 72 inside said floating pipe 71 to activate said sensor 74 provided on one side of said water tank 2 such that the message received by said sensor 74 is transmitted to an IC board of the heating device of the hot beverage machine 8 and such that the power of said heating device of said water tank 2 is shut down to prevent overheating of said hot beverage machine 8.

Figure 7:
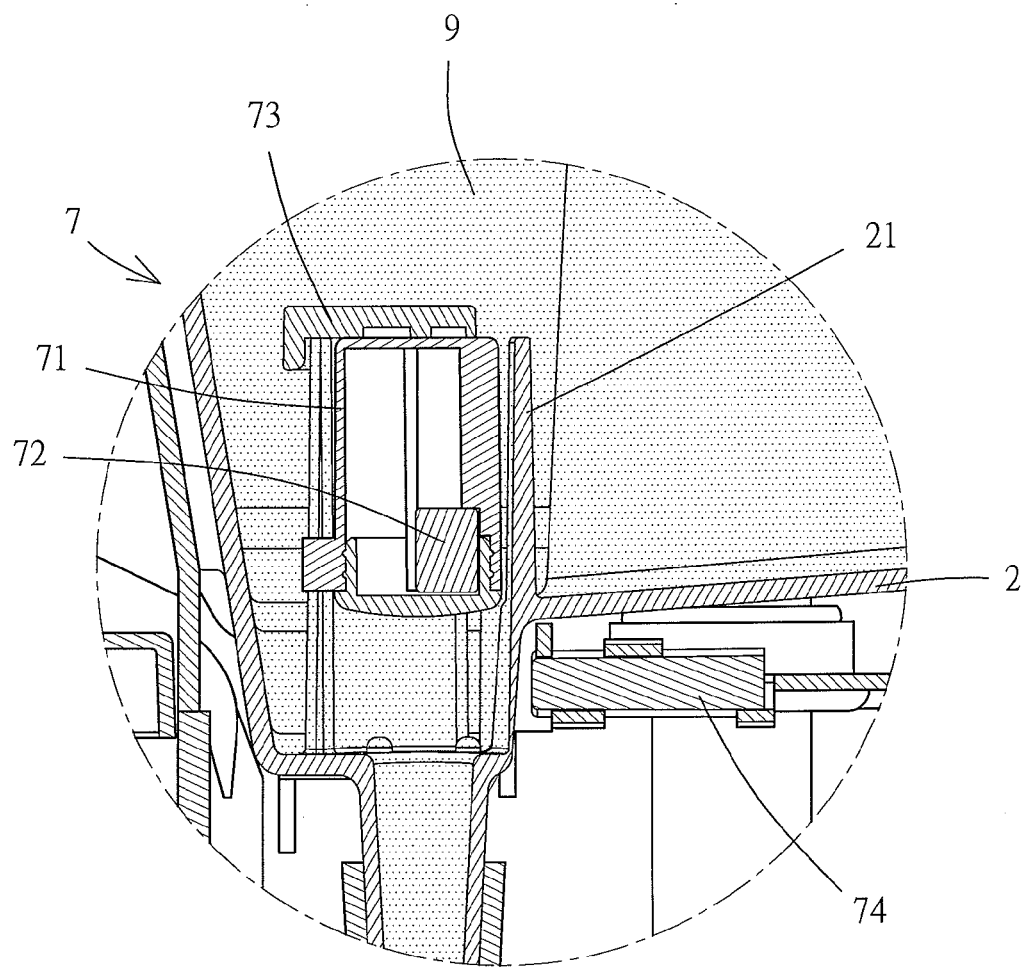
FIG. 7 is an illustration showing the floating pipe at a proper water level in FIG. 5.

As shown in FIG. 7, the raising of the water level of the raw water 9 in the water tank 2 would also cause the floating pipe 71 in the overheating power shutdown apparatus 7 of the hot beverage machine 8 to move upward, which would then drive the magnet 72 inside the floating pipe 71 to move upward correspondingly and to disengage from the sensor 74 on one side of the water tank 2 and away from an activation range thereof such that the heating device of the water tank 2 can then be reset again for heating process in order to heat and boil the raw water guided into the internal heating assembly to water steam and to perform brewing of the beverage material with steam.

What is claimed is:

1. A power shutdown apparatus for preventing overheating of a hot beverage machine, comprising: a tubular section protruding upward from a bottom portion of a water tank of said hot beverage machine and penetrating in a top-down manner, a lower end of said tubular section connected to an internal heating assembly via a water pipe, a floating pipe mounted adjacent to an upper space inside said tubular section, a magnet received within said floating pipe, a limiter attached to an upper opening of said tubular section without covering said tubular section to allow water to be poured into said water tank, a sensor attached to one side of said bottom portion of said water tank and adjacent to a sinking portion of said floating pipe; and wherein said floating pipe inside said tubular section sinks correspondingly with a low water level dropped by said water in said water tank to drive said magnet inside said floating pipe to activate said sensor provided on one side of said water tank such that power of said heating device of said water tank is shut down to prevent overheating of said hot beverage machine.

2. The power shutdown apparatus for preventing overheating of a hot beverage machine as claimed in claim 1, wherein an additional tubular section further protrudes outward from a lower end of said tubular section protruding upward from said bottom portion of said water tank of said hot beverage machine and penetrating in said top-down manner and is connected to a lower inlet of said internal heating assembly for heating a raw water of said hot beverage machine via a water pipe.

3. The power shutdown apparatus for preventing overheating of a hot beverage machine as claimed in claim 1, wherein said limiter attached to said upper opening of said tubular section at said bottom portion of said water tank is secured by a way of locking.

4. The power shutdown apparatus for preventing overheating of a hot beverage machine as claimed in claim 1, wherein said tubular section protruding upward from said bottom portion of said water tank of said hot beverage machine and penetrating in said top-down manner comprises an internal space having a shape of a wider upper opening and slanted to a narrower lower end such that a upward and downward movement of said floating pipe is facilitated.

* * * * *